(12) United States Patent
Yuhara et al.

(10) Patent No.: US 7,885,599 B2
(45) Date of Patent: Feb. 8, 2011

(54) SYSTEM, METHOD AND COMPUTER PROGRAM PRODUCT FOR RECEIVING DATA FROM A SATELLITE RADIO NETWORK

(75) Inventors: Hiromitsu Yuhara, Rancho Palos Verdes, CA (US); Masayuki Habaguchi, Rolling Hills Estates, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/722,935

(22) Filed: Mar. 12, 2010

(65) Prior Publication Data

US 2010/0165909 A1    Jul. 1, 2010

Related U.S. Application Data

(63) Continuation of application No. 12/053,533, filed on Mar. 21, 2008, now Pat. No. 7,715,781, which is a continuation of application No. 10/400,831, filed on Mar. 27, 2003, now Pat. No. 7,415,243.

(51) Int. Cl.
  *H04H 60/09* (2008.01)
  *H04H 40/00* (2008.01)
  *H04B 7/00* (2006.01)

(52) U.S. Cl. ................ 455/3.01; 455/66.1; 455/344

(58) Field of Classification Search ............... 455/3.01, 455/3.06, 3.04, 12.1, 66.1, 344
See application file for complete search history.

(56) References Cited

U.S. PATENT DOCUMENTS

| | | |
|---|---|---|
| 3,646,580 A | 2/1972 | Fuller et al. |
| 4,404,639 A | 9/1983 | McGuire et al. |
| 4,989,146 A | 1/1991 | Imajo |
| 5,157,714 A | 10/1992 | Spicer |
| 5,173,691 A | 12/1992 | Sumner |

(Continued)

FOREIGN PATENT DOCUMENTS

EP    0973299    1/2000

(Continued)

OTHER PUBLICATIONS

Irwin M. Jacobs, "The Application of a Novel Two-Way Mobile Satellite Communications and Vehicle Tracking System to the Transportation Industry," IEEE Transactions on Vehicular Technology, vol. 40, No. 1, pp. 57-63, Feb. 1991.

(Continued)

*Primary Examiner*—Tilahun Gesesse
(74) *Attorney, Agent, or Firm*—Plumsea Law Group, LLC

(57) ABSTRACT

A system, method and computer program product are disclosed for receiving data from a satellite radio network in accordance with an embodiment of the present invention. In accordance with an embodiment of the present invention, a datagram broadcast via a satellite radio network is received utilizing a receiver. The datagram includes broadcast identifier information that identifies a segment of receivers in the satellite radio network to which the datagram is directed. Utilizing the broadcast identifier information, a determination is made as to whether the recipient receiver is a member of the identified segment of receivers to which the datagram is directed. If the recipient receiver is determined to be a member of the identified segment of receivers to which the datagram is directed, then the datagram is processed.

20 Claims, 7 Drawing Sheets

U.S. PATENT DOCUMENTS

| | | | |
|---|---|---|---|
| 5,182,555 A | 1/1993 | Sumner | |
| 5,359,529 A | 10/1994 | Snider | |
| 5,388,045 A | 2/1995 | Kamiya et al. | |
| 5,420,794 A | 5/1995 | James | |
| 5,442,553 A | 8/1995 | Parrillo | |
| 5,445,347 A | 8/1995 | Ng | |
| 5,506,773 A | 4/1996 | Takaba et al. | |
| 5,508,931 A | 4/1996 | Snider | |
| 5,546,305 A | 8/1996 | Kondo | |
| 5,551,064 A | 8/1996 | Nobbe et al. | |
| 5,563,788 A | 10/1996 | Yoon | |
| 5,590,040 A | 12/1996 | Abe et al. | |
| 5,635,924 A | 6/1997 | Tran et al. | |
| 5,636,245 A | 6/1997 | Ernst et al. | |
| 5,648,768 A | 7/1997 | Bouve | |
| 5,649,300 A | 7/1997 | Snyder et al. | |
| 5,661,787 A | 8/1997 | Pocock | |
| 5,664,948 A | 9/1997 | Dimitriadis et al. | |
| 5,671,195 A | 9/1997 | Lee | |
| 5,682,525 A | 10/1997 | Bouve et al. | |
| 5,696,676 A | 12/1997 | Takaba | |
| 5,699,056 A | 12/1997 | Yoshida | |
| 5,757,645 A | 5/1998 | Schneider et al. | |
| 5,774,827 A | 6/1998 | Smith et al. | |
| 5,781,871 A | 7/1998 | Mezger et al. | |
| 5,802,545 A | 9/1998 | Coverdill | |
| 5,862,510 A | 1/1999 | Saga et al. | |
| 5,864,305 A | 1/1999 | Rosenquist | |
| 5,878,056 A | 3/1999 | Black et al. | |
| 5,892,463 A | 4/1999 | Hikita et al. | |
| 5,926,108 A | 7/1999 | Wicks et al. | |
| 5,931,878 A | 8/1999 | Chapin, Jr. | |
| 5,959,577 A | 9/1999 | Fan et al. | |
| 5,964,811 A | 10/1999 | Ishii et al. | |
| 5,982,298 A | 11/1999 | Lappenbusch et al. | |
| 5,999,882 A | 12/1999 | Simpson et al. | |
| 6,032,046 A | 2/2000 | Nakano | |
| 6,073,007 A | 6/2000 | Doyle | |
| 6,078,865 A | 6/2000 | Koyanagi | |
| 6,085,146 A | 7/2000 | Kuribayashi et al. | |
| 6,111,521 A | 8/2000 | Mulder et al. | |
| 6,169,894 B1 | 1/2001 | McCormick et al. | |
| 6,169,902 B1 | 1/2001 | Kawamoto | |
| 6,195,602 B1 | 2/2001 | Hazama et al. | |
| 6,208,935 B1 | 3/2001 | Yamada et al. | |
| 6,212,388 B1 | 4/2001 | Seo | |
| 6,236,330 B1 | 5/2001 | Cohen | |
| 6,240,364 B1 | 5/2001 | Kerner et al. | |
| 6,240,369 B1 | 5/2001 | Foust | |
| 6,243,647 B1 | 6/2001 | Berstis et al. | |
| 6,246,320 B1 | 6/2001 | Monroe | |
| 6,266,607 B1 | 7/2001 | Meis et al. | |
| 6,266,608 B1 | 7/2001 | Pertz | |
| 6,292,723 B1 | 9/2001 | Brogan et al. | |
| 6,297,748 B1 | 10/2001 | Lappenbusch et al. | |
| 6,298,423 B1 | 10/2001 | Johnson et al. | |
| 6,308,120 B1 | 10/2001 | Good | |
| 6,317,686 B1 | 11/2001 | Ran | |
| 6,329,925 B1 | 12/2001 | Skiver et al. | |
| 6,330,499 B1 | 12/2001 | Chou et al. | |
| 6,335,729 B2 | 1/2002 | Nunokawa et al. | |
| 6,339,736 B1 | 1/2002 | Moskowitz et al. | |
| 6,351,709 B2 | 2/2002 | King et al. | |
| 6,356,822 B1 | 3/2002 | Diaz et al. | |
| 6,362,730 B2 | 3/2002 | Razavi et al. | |
| 6,370,454 B1 | 4/2002 | Moore | |
| 6,373,883 B1 | 4/2002 | Soerensen et al. | |
| 6,381,533 B1 | 4/2002 | Crane et al. | |
| 6,389,337 B1 | 5/2002 | Kolls | |
| 6,392,565 B1 * | 5/2002 | Brown | 340/988 |
| 6,397,067 B1 | 5/2002 | Tanaka et al. | |
| 6,397,076 B1 | 5/2002 | Brown et al. | |
| 6,408,307 B1 | 6/2002 | Semple et al. | |
| 6,421,593 B1 | 7/2002 | Kempen et al. | |
| 6,433,735 B1 | 8/2002 | Bloebaum et al. | |
| 6,434,455 B1 | 8/2002 | Snow et al. | |
| 6,438,490 B2 | 8/2002 | Ohta | |
| 6,459,961 B1 | 10/2002 | Obradovich et al. | |
| 6,477,452 B2 | 11/2002 | Good | |
| 6,480,105 B2 | 11/2002 | Edwards | |
| 6,480,145 B1 | 11/2002 | Hasegawa | |
| 6,510,317 B1 | 1/2003 | Marko et al. | |
| 6,519,528 B2 | 2/2003 | Endo et al. | |
| 6,522,250 B1 | 2/2003 | Ernst et al. | |
| 6,526,335 B1 | 2/2003 | Treyz et al. | |
| 6,529,143 B2 | 3/2003 | Mikkola et al. | |
| 6,539,269 B1 | 3/2003 | Jarrow et al. | |
| 6,539,302 B1 | 3/2003 | Bender et al. | |
| 6,542,794 B2 | 4/2003 | Obradovich | |
| 6,542,822 B1 | 4/2003 | Froeberg | |
| 6,549,833 B2 | 4/2003 | Katagishi et al. | |
| 6,552,682 B1 | 4/2003 | Fan | |
| 6,553,289 B2 | 4/2003 | Maki et al. | |
| 6,553,290 B1 | 4/2003 | Pillar | |
| 6,553,308 B1 | 4/2003 | Uhlmann et al. | |
| 6,553,313 B1 | 4/2003 | Froeberg | |
| 6,577,934 B2 | 6/2003 | Matsunaga et al. | |
| 6,583,734 B2 | 6/2003 | Bates et al. | |
| 6,587,759 B2 | 7/2003 | Obradovich et al. | |
| 6,587,777 B1 | 7/2003 | St. Pierre | |
| 6,587,787 B1 | 7/2003 | Yokota | |
| 6,590,507 B2 | 7/2003 | Burns | |
| 6,594,576 B2 | 7/2003 | Fan et al. | |
| 6,597,904 B1 | 7/2003 | Neustein | |
| 6,603,405 B2 | 8/2003 | Smith | |
| 6,604,038 B1 | 8/2003 | Lesesky et al. | |
| 6,609,004 B1 | 8/2003 | Morse et al. | |
| 6,611,201 B1 | 8/2003 | Bishop et al. | |
| 6,611,740 B2 | 8/2003 | Lowrey et al. | |
| 6,611,753 B1 | 8/2003 | Millington | |
| 6,611,755 B1 | 8/2003 | Coffee et al. | |
| 6,615,130 B2 | 9/2003 | Myr | |
| 6,615,133 B2 | 9/2003 | Boies et al. | |
| 6,615,186 B1 | 9/2003 | Kolls | |
| 6,618,669 B2 | 9/2003 | Ota et al. | |
| 6,633,238 B2 | 10/2003 | Lemelson et al. | |
| 6,636,721 B2 | 10/2003 | Threadgill et al. | |
| 6,647,417 B1 | 11/2003 | Hunter et al. | |
| 6,654,600 B1 | 11/2003 | Pollak et al. | |
| 6,657,558 B2 | 12/2003 | Horita et al. | |
| 6,658,485 B1 | 12/2003 | Baber et al. | |
| 6,662,090 B2 | 12/2003 | Toyama et al. | |
| 6,662,091 B2 | 12/2003 | Wilson et al. | |
| 6,664,922 B1 | 12/2003 | Fan | |
| 6,668,219 B2 | 12/2003 | Hwang et al. | |
| 6,677,854 B2 | 1/2004 | Dix | |
| 6,680,694 B1 | 1/2004 | Knockeart et al. | |
| 6,681,120 B1 | 1/2004 | Kim | |
| 6,691,025 B2 | 2/2004 | Reimer | |
| 6,697,633 B1 | 2/2004 | Dogan et al. | |
| 6,701,231 B1 | 3/2004 | Borugian | |
| 6,701,232 B2 | 3/2004 | Yamaki | |
| 6,707,421 B1 | 3/2004 | Drury et al. | |
| 6,711,398 B1 | 3/2004 | Talaie et al. | |
| 6,714,797 B1 | 3/2004 | Rautila | |
| 6,720,920 B2 | 4/2004 | Breed et al. | |
| 6,721,685 B2 | 4/2004 | Kodama | |
| 6,724,827 B1 | 4/2004 | Patsiokas et al. | |
| 6,730,940 B1 | 5/2004 | Steranka et al. | |
| 6,732,031 B1 | 5/2004 | Lightner et al. | |
| 6,735,416 B1 | 5/2004 | Marko et al. | |
| 6,735,504 B2 | 5/2004 | Katagishi et al. | |
| 6,738,697 B2 | 5/2004 | Breed | |
| 6,741,188 B1 | 5/2004 | Miller et al. | |

| Patent/Pub No. | Date | Name |
|---|---|---|
| 6,741,834 B1 | 5/2004 | Godwin |
| 6,741,856 B2 | 5/2004 | McKenna et al. |
| 6,748,317 B2 | 6/2004 | Maruyama et al. |
| 6,754,485 B1 | 6/2004 | Obradovich et al. |
| 6,754,570 B2 | 6/2004 | Iihoshi et al. |
| 6,757,712 B1 | 6/2004 | Bastian et al. |
| 6,785,551 B1 | 8/2004 | Richard |
| 6,798,358 B2 | 9/2004 | Joyce et al. |
| 6,804,490 B2 | 10/2004 | Cook et al. |
| 6,804,589 B2 | 10/2004 | Foxford et al. |
| 6,810,323 B1 | 10/2004 | Bullock et al. |
| 6,812,860 B1 | 11/2004 | Schwarzwalder, Jr. |
| 6,812,888 B2 | 11/2004 | Drury et al. |
| 6,813,549 B2 | 11/2004 | Good |
| 6,816,778 B2 | 11/2004 | Diaz |
| 6,819,986 B2 | 11/2004 | Hong et al. |
| 6,823,169 B2 | 11/2004 | Marko et al. |
| 6,823,263 B1 | 11/2004 | Kelly et al. |
| 6,836,539 B2 | 12/2004 | Katou et al. |
| 6,836,667 B1 | 12/2004 | Smith, Jr. |
| 6,847,871 B2 | 1/2005 | Malik et al. |
| 6,847,872 B2 | 1/2005 | Bodin et al. |
| 6,847,889 B2 | 1/2005 | Park et al. |
| 6,850,823 B2 | 2/2005 | Eun et al. |
| 6,859,720 B2 | 2/2005 | Satoh et al. |
| 6,870,487 B2 | 3/2005 | Nuesser et al. |
| 6,871,067 B2 | 3/2005 | Clark et al. |
| 6,901,374 B1 | 5/2005 | Himes |
| 6,911,918 B2 | 6/2005 | Chen |
| 6,920,382 B2 | 7/2005 | Katagishi et al. |
| 6,928,423 B1 | 8/2005 | Yamanaka |
| 6,944,430 B2 | 9/2005 | Bertstis |
| 6,950,649 B2 | 9/2005 | Videtich |
| 6,971,070 B2 | 11/2005 | Obradovich et al. |
| 6,983,200 B2 | 1/2006 | Bodin et al. |
| 6,987,964 B2 | 1/2006 | Obradovich |
| 6,988,034 B1 | 1/2006 | Marlatt et al. |
| 6,993,421 B2 | 1/2006 | Pillar et al. |
| 6,995,686 B2 | 2/2006 | Gosdin et al. |
| 7,010,263 B1 * | 3/2006 | Patsiokas ............... 455/3.02 |
| 7,010,297 B2 | 3/2006 | Yokota |
| 7,170,390 B2 | 1/2007 | Quinones et al. |
| 7,174,301 B2 | 2/2007 | Florance et al. |
| 7,184,866 B2 | 2/2007 | Squires et al. |
| 7,210,142 B2 | 4/2007 | Hilt et al. |
| 7,216,109 B1 | 5/2007 | Donner |
| 7,292,848 B2 | 11/2007 | Mazzara et al. |
| 7,307,513 B2 | 12/2007 | Shutter et al. |
| 7,415,243 B2 | 8/2008 | Yuhara et al. |
| 7,590,381 B2 | 9/2009 | Zink et al. |
| 7,643,788 B2 | 1/2010 | Habaguchi et al. |
| 2001/0001848 A1 | 5/2001 | Oshizawa et al. |
| 2002/0002534 A1 | 1/2002 | Davis et al. |
| 2002/0016655 A1 | 2/2002 | Joao |
| 2002/0029339 A1 | 3/2002 | Rowe |
| 2002/0032507 A1 | 3/2002 | Diaz et al. |
| 2002/0044049 A1 | 4/2002 | Saito et al. |
| 2002/0049531 A1 | 4/2002 | Tanaka et al. |
| 2002/0067289 A1 | 6/2002 | Smith |
| 2002/0072378 A1 | 6/2002 | Gaal |
| 2002/0073012 A1 | 6/2002 | Lowell et al. |
| 2002/0077741 A1 | 6/2002 | Hanebrink |
| 2002/0080022 A1 | 6/2002 | Edwards |
| 2002/0087237 A1 | 7/2002 | Ol et al. |
| 2002/0103582 A1 | 8/2002 | Ohmura et al. |
| 2002/0103583 A1 | 8/2002 | Ohmura et al. |
| 2002/0103597 A1 | 8/2002 | Takayama et al. |
| 2002/0152021 A1 | 10/2002 | Ota et al. |
| 2002/0152115 A1 | 10/2002 | Morita et al. |
| 2002/0156692 A1 | 10/2002 | Squeglia et al. |
| 2002/0161495 A1 | 10/2002 | Yamaki |
| 2002/0161841 A1 | 10/2002 | Kinnunen |
| 2002/0165662 A1 | 11/2002 | Maruyama et al. |
| 2002/0165665 A1 | 11/2002 | Kim |
| 2002/0176494 A1 | 11/2002 | Zhao et al. |
| 2002/0177926 A1 | 11/2002 | Lockwood et al. |
| 2002/0183059 A1 | 12/2002 | Noreen et al. |
| 2002/0193923 A1 | 12/2002 | Toyama et al. |
| 2002/0198632 A1 | 12/2002 | Breed et al. |
| 2002/0198637 A1 | 12/2002 | Shibata |
| 2003/0028297 A1 | 2/2003 | Iihoshi et al. |
| 2003/0051239 A1 | 3/2003 | Hudspeth |
| 2003/0063628 A1 | 4/2003 | Marko et al. |
| 2003/0069683 A1 | 4/2003 | Lapidot et al. |
| 2003/0081587 A1 | 5/2003 | Ichiyoshi |
| 2003/0083813 A1 | 5/2003 | Park |
| 2003/0093476 A1 | 5/2003 | Syed |
| 2003/0095038 A1 | 5/2003 | Dix |
| 2003/0098782 A1 | 5/2003 | Eastman et al. |
| 2003/0109972 A1 | 6/2003 | Tak |
| 2003/0117982 A1 | 6/2003 | Minnick |
| 2003/0158640 A1 | 8/2003 | Pillar et al. |
| 2003/0169182 A1 | 9/2003 | Wilhelm et al. |
| 2003/0191583 A1 | 10/2003 | Uhlmann et al. |
| 2003/0195695 A1 | 10/2003 | Maruyama et al. |
| 2003/0195814 A1 | 10/2003 | Striemer |
| 2003/0216859 A1 | 11/2003 | Martell et al. |
| 2003/0220835 A1 | 11/2003 | Barnes, Jr. |
| 2003/0225516 A1 | 12/2003 | DeKock et al. |
| 2003/0229441 A1 | 12/2003 | Pechatnikov et al. |
| 2003/0236613 A1 | 12/2003 | Satoh et al. |
| 2004/0012501 A1 | 1/2004 | Mazzara et al. |
| 2004/0024753 A1 | 2/2004 | Chane et al. |
| 2004/0044605 A1 | 3/2004 | Kress Bodin et al. |
| 2004/0059781 A1 | 3/2004 | Yoakum et al. |
| 2004/0068362 A1 | 4/2004 | Maekawa et al. |
| 2004/0068364 A1 | 4/2004 | Zhao et al. |
| 2004/0073356 A1 | 4/2004 | Craine |
| 2004/0075774 A1 | 4/2004 | Chang et al. |
| 2004/0080430 A1 | 4/2004 | Videtich |
| 2004/0085198 A1 | 5/2004 | Saito et al. |
| 2004/0093243 A1 | 5/2004 | Bodin et al. |
| 2004/0102898 A1 | 5/2004 | Yokota et al. |
| 2004/0104842 A1 | 6/2004 | Drury et al. |
| 2004/0110515 A1 | 6/2004 | Blumberg et al. |
| 2004/0148099 A1 | 7/2004 | Kim |
| 2004/0167707 A1 | 8/2004 | Bragansa et al. |
| 2004/0192189 A1 | 9/2004 | Yuhara et al. |
| 2004/0198217 A1 | 10/2004 | Lee et al. |
| 2004/0203630 A1 | 10/2004 | Wang |
| 2004/0204821 A1 | 10/2004 | Tu |
| 2004/0204842 A1 | 10/2004 | Shinozaki |
| 2004/0208204 A1 | 10/2004 | Crinon |
| 2004/0233070 A1 | 11/2004 | Finnern |
| 2004/0233101 A1 | 11/2004 | Kim |
| 2004/0239531 A1 | 12/2004 | Adamczyk |
| 2004/0249529 A1 | 12/2004 | Kelly et al. |
| 2004/0249530 A1 | 12/2004 | Kelly et al. |
| 2004/0249531 A1 | 12/2004 | Kelly et al. |
| 2004/0249532 A1 | 12/2004 | Kelly et al. |
| 2004/0252197 A1 | 12/2004 | Fraley et al. |
| 2004/0260786 A1 | 12/2004 | Barile |
| 2005/0001743 A1 | 1/2005 | Haemerle |
| 2005/0015186 A1 | 1/2005 | Kelly et al. |
| 2005/0015199 A1 | 1/2005 | Lokshin et al. |
| 2005/0021197 A1 | 1/2005 | Zimmerman et al. |
| 2005/0021199 A1 | 1/2005 | Zimmerman et al. |
| 2005/0027436 A1 | 2/2005 | Yoshikawa et al. |
| 2005/0027449 A1 | 2/2005 | Marsh |
| 2005/0033511 A1 | 2/2005 | Pechatnikov et al. |
| 2005/0038581 A1 | 2/2005 | Kapolka et al. |
| 2005/0038596 A1 | 2/2005 | Yang et al. |
| 2005/0043880 A1 | 2/2005 | Yamane et al. |
| 2005/0060070 A1 | 3/2005 | Kapolka et al. |
| 2005/0065678 A1 | 3/2005 | Smith et al. |
| 2005/0068174 A1 | 3/2005 | Oesterling et al. |

| | | | | | | |
|---|---|---|---|---|---|---|
| 2005/0075095 A1 | 4/2005 | Dillon | | JP | 8149029 | 6/1996 |
| 2005/0080519 A1 | 4/2005 | Oesterling et al. | | JP | 10150477 | 6/1998 |
| 2005/0090951 A1 | 4/2005 | Good | | JP | 2000201104 | 7/2000 |
| 2005/0096811 A1 | 5/2005 | Bodin et al. | | JP | 2000293788 | 10/2000 |
| 2005/0125117 A1 | 6/2005 | Breed | | JP | 2001168743 | 6/2001 |
| 2005/0131626 A1 | 6/2005 | Ignatin | | JP | 2001216555 | 8/2001 |
| 2005/0137763 A1 | 6/2005 | Watkins et al. | | JP | 2002032276 | 1/2002 |
| 2005/0137790 A1 | 6/2005 | Yamada et al. | | JP | 2002077295 | 3/2002 |
| 2005/0222760 A1 | 10/2005 | Cabral et al. | | JP | 2002084298 | 3/2002 |
| 2005/0273218 A1 | 12/2005 | Breed et al. | | JP | 2002318844 | 10/2002 |
| 2005/0288856 A1 | 12/2005 | Uyeki et al. | | | | |
| 2006/0046649 A1 | 3/2006 | Videtich | | | | |
| 2006/0055565 A1 | 3/2006 | Kawamata et al. | | | | |
| 2006/0116800 A1 | 6/2006 | Obradovich et al. | | | | |
| 2008/0088480 A1 | 4/2008 | Rozum et al. | | | | |
| 2008/0106436 A1 | 5/2008 | Breed | | | | |

FOREIGN PATENT DOCUMENTS

| | | |
|---|---|---|
| JP | 6276056 | 9/1994 |

OTHER PUBLICATIONS

Acidus, "The Flawed Future of Radio," 2600 Magazine, Jan. 15, 2003.

"Sirius Satellite Radio—Help," Archive.org, Oct. 6, 2002.

* cited by examiner

ID confirmation
508

Group ID & Area ID are inside Broadcast ID

Both match: Data is for this vehicle
Else: Data is not for this vehicle

602

Only Group ID or Area ID is inside Broadcast ID

Group or Area ID match: Data is for this vehicle
Else: Data is not for this vehicle

604

Only Individual ID is inside Broadcast ID

Individual ID match: Data is for this vehicle
Else: Data is not for this vehicle

SYSTEM, METHOD AND COMPUTER PROGRAM PRODUCT FOR RECEIVING DATA FROM A SATELLITE RADIO NETWORK

CROSS-REFERENCE TO RELATED APPLICATION

This application is a continuation of U.S. Pat. No. 7,715,781, currently U.S. application Ser. No. 12/053,533, entitled "System, Method And Computer Program Product For Receiving Data From A Satellite Radio," filed on Mar. 21, 2008, and allowed on Dec. 23, 2009, which application is a continuation of U.S. application Ser. No. 10/400,831, now U.S. Pat. No. 7,415,243, entitled "System, Method And Computer Program Product For Receiving Data From A Satellite Radio," filed on Mar. 27, 2003 and issued on Aug. 19, 2008, the contents of each of which are incorporated in their entirety into this disclosure by reference.

BACKGROUND

This invention relates to broadcasting of data and more particularly to broadcasting data to a defined group of remotely located recipients.

Satellite radio networks may be utilized to provide satellite digital audio services to compatible radio receivers. In a satellite radio network, the same data is typically simultaneously transmitted to all receivers in the network so that all receivers receive the same broadcast data. The general broadcast character of satellite radio transmissions hinders the easy transmission of data that is intended only for a segment of the receivers especially when the amount of data to be transmitted is large.

Many of today's satellite radio receivers are being installed in automobiles and other vehicles. Because of the increasing number of vehicles with satellite radio receivers, automobile manufactures are being presented with a potentially useful way of providing information to users of their vehicles. For example, to the automobile manufacturers, it may be extremely desirable to deliver service and/or recall information to their vehicles' users via satellite radio.

Most service and recall information, however, is directed at a particular make and model of vehicle and rarely applies to all vehicles having a satellite radio receiver (let alone all vehicles of a particular manufacturer). Unfortunately, the difficulty in delivering information to a targeted segment of satellite radio receivers provides a difficult challenge in providing such service and/or recall information to a targeted segment of recipient vehicles.

In addition, today's satellite radio networks fail to provide a means for permitting changing or updating of the group of intended recipients. For example, once a vehicle has been repaired after receiving a service or recall notification via satellite radio, the vehicle may no longer be an intended recipient to a subsequent reminder message directed to those vehicles that have not yet been serviced. Receiving such a reminder message could lead to annoying or confusing users of an already serviced vehicle.

SUMMARY

A system, method and computer program product are disclosed for receiving data from a satellite radio network in accordance with an embodiment of the present invention. In accordance with an embodiment of the present invention, a datagram broadcast via a satellite radio network is received utilizing a receiver. The datagram includes broadcast identifier information that identifies a segment of receivers in the satellite radio network to which the datagram is directed. Utilizing the broadcast identifier information, a determination is made as to whether the recipient receiver is a member of the identified segment of receivers to which the datagram is directed. If the recipient receiver is determined to be a member of the identified segment of receivers to which the datagram is directed, then the datagram is processed.

In one embodiment, the recipient receiver may be located in a vehicle. In another embodiment, the broadcast identifier information of the datagram may be compared with locally stored identifier information of the recipient receiver to determine if the recipient receiver is a member of the identified segment of receivers to which the datagram is directed. In an additional embodiment, the broadcast identifier information may include information identifying a geographic area to which the datagram is directed. In such an embodiment, the broadcast identifier information may be compared with information about a geographic location of the recipient receiver to determine whether the recipient receiver is in the geographic area to which the datagram is directed. As a further option in such an embodiment, the geographic location information of the recipient receiver may be obtained utilizing a global positioning system.

In a further embodiment, the broadcast identifier information may include information that identifies a subject matter of the datagram. In such an embodiment, the broadcast identifier information may be compared with locally stored identifier information of the recipient receiver to determine whether the datagram is directed to the recipient receiver. In such an embodiment, a user of the recipient receiver may be able to define at least a portion of the locally stored identifier information that is compared with the broadcast identifier information.

In an embodiment, the datagram may include an instruction to modify at least a portion of locally stored identifier information of the recipient receiver. In such an embodiment, the processing of the datagram may include modifying the locally stored identifier information according to the instruction. As an option, a modified portion of the locally stored identifier information may define at least one segment of receivers in the satellite radio network to which the recipient receiver belongs. As another option, a contact may be notified upon modification of the locally stored identifier information. In such an embodiment, the contact may be notified via a cellular wireless communication link.

In another embodiment, the processing of the datagram may include storing the datagram in memory. In an additional embodiment, the processing of the datagram may include informing a user of the recipient receiver of the receipt of the datagram. In yet a further embodiment, the processing of the datagram may include determining whether a previously received copy of the datagram is stored in memory coupled to the recipient receiver. In such an embodiment, a determination may be made as to whether the received datagram includes information for updating and/or deleting the previously received copy of the datagram stored in memory. In even another embodiment, an instruction to modify at least a portion of locally stored identifier information of the recipient receiver may be received via a cellular wireless communication link. In this embodiment, the locally stored identifier information may then be modified according to the instruction.

In one embodiment, a modified portion of the locally stored identifier information may define at least one segment of receivers in the satellite radio network to which the recipient receiver is a member. In an additional embodiment, the datagram may include audio information and the processing of the datagram may include presenting the audio information of the datagram utilizing an audio component coupled to the recipient receiver. In a further embodiment, the datagram may include visual information that may be presented utilizing a visual component coupled to the recipient receiver during the processing of the datagram.

In one embodiment, diagnostic information may also be collected about a vehicle in which the recipient receiver is located. In such an embodiment, the processing of the datagram may include a determination as to whether information in the datagram relates to the collected diagnostic information, and if so, presenting the information of the datagram relating to the diagnostic information to a user of the recipient receiver.

BRIEF DESCRIPTION OF THE DRAWINGS

FIG. 6 is a depiction of three exemplary scenarios for identifier confirmation in determining whether a received data packet is directed at the recipient receiver in accordance with an embodiment of the present invention.

DETAILED DESCRIPTION

Figure 1:
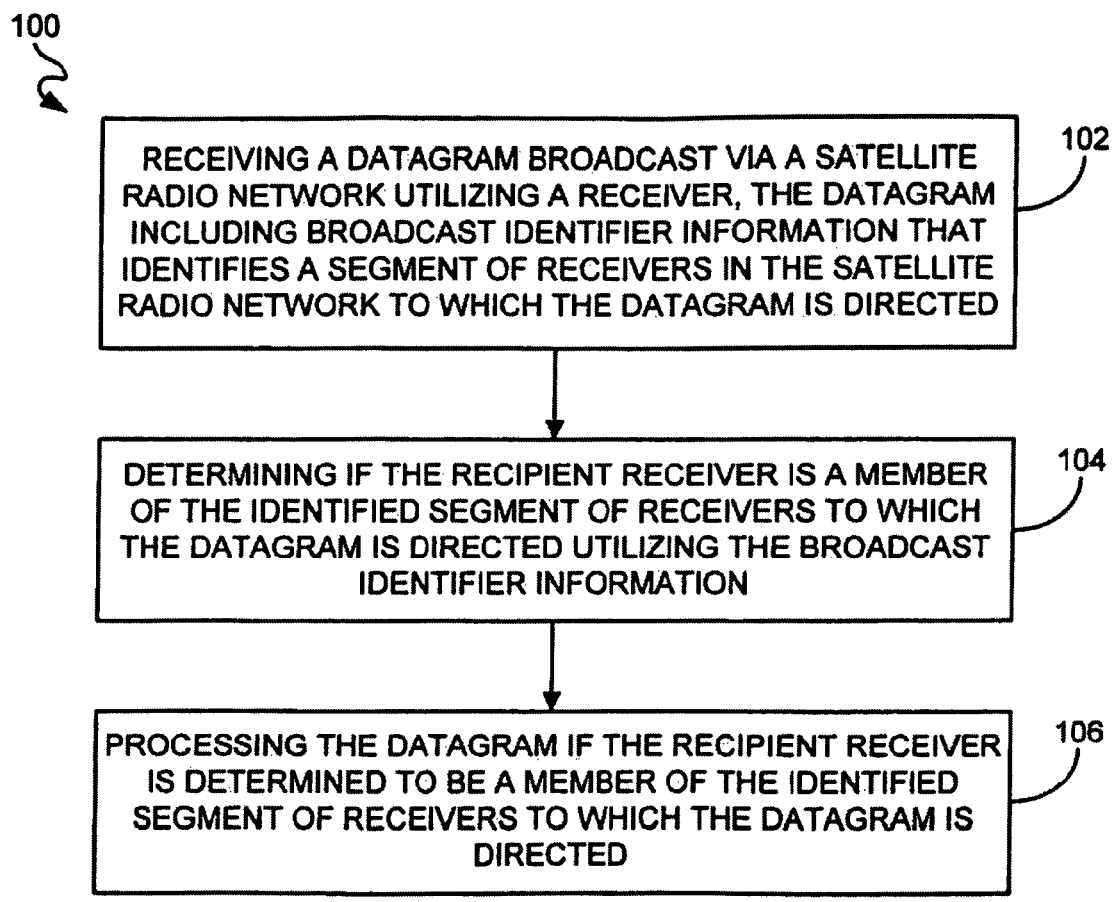
FIG. 1 is a flowchart of a process for receiving data from a satellite radio network in accordance with an embodiment of the present invention.

FIG. 1 is a flowchart of a process 100 for receiving data from a satellite radio network in accordance with an embodiment of the present invention. In operation 102, a datagram broadcast via a satellite radio network is received utilizing a receiver. The datagram includes broadcast identifier information that identifies a segment of receivers in the satellite radio network to which the datagram is directed. In one embodiment, the recipient receiver may be located in a vehicle. As an option, the datagram may be checked for transmission errors upon receipt. In one such embodiment, the datagram may include a check sum that is utilized in checking the received datagram has transmission errors.

As set forth in operation 104 of FIG. 1, a determination is made utilizing the broadcast identifier information to determine whether the recipient receiver is a member of the identified segment of receivers to which the datagram is directed. In one embodiment, the broadcast identifier information of the datagram may be compared with locally stored identifier information of the recipient receiver to determine if the recipient receiver is a member of the identified segment of receivers to which the datagram is directed.

In an additional embodiment, the broadcast identifier information may include information identifying a geographic area to which the datagram is directed. In such an embodiment, the broadcast identifier information may be compared with information about a geographic location of the recipient receiver to determine whether the recipient receiver is in the geographic area to which the datagram is directed. As a further option in such an embodiment, the geographic location information of the recipient receiver may be obtained utilizing a global positioning system. For example, in such an embodiment, the recipient receiver may be coupled to a GPS receiver capable of receiving GPS information from a GPS transmitter (such as, e.g., a GPS satellite) or, as another option, directly from a satellite in the satellite radio network.

In a further embodiment, the broadcast identifier information may include information that identifies a subject matter of the datagram. In such an embodiment, the broadcast identifier information may be compared with locally stored identifier information of the recipient receiver to determine whether the datagram is directed to the recipient receiver. Additionally, a user of the recipient receiver may also be able to define at least a portion of the locally stored identifier information that is compared with the broadcast identifier information.

With continuing reference to FIG. 1, if the recipient receiver is determined to be a member of the identified segment of receivers to which the datagram is directed, then the datagram is processed in operation 106. In one embodiment, the processing of the datagram may include storing the datagram in memory. In another embodiment, the processing of the datagram may include informing a user of the recipient receiver of the receipt of the datagram.

In a further embodiment, the datagram may include an instruction to modify at least a portion of locally stored identifier information of the recipient receiver. In such an embodiment, the processing of the datagram may include modifying the locally stored identifier information according to the instruction. As an option, a modified portion of the locally stored identifier information may define at least one segment of receivers in the satellite radio network to which the recipient receiver belongs. As another option, a contact (such as, for example, a service center, a dealer, a manufacturer, a satellite radio network provider, a location or node in the satellite radio network such as a radio station, and/or even a user of the recipient receiver) may be notified upon modification of the locally stored identifier information. In such an embodiment, the contact may be notified via a cellular wireless communication link. In one embodiment, the datagram may be broadcast via a non-satellite radio transmission or other type of general broadcast transmission.

In one embodiment, the processing of the datagram may include determining whether a previously received copy of the datagram is stored in memory coupled to the recipient receiver. In such an embodiment, a determination may be made as to whether the received datagram includes information for updating and/or deleting the previously received copy of the datagram stored in memory. In even another embodiment, an instruction to modify at least a portion of locally stored identifier information of the recipient receiver may be received via a cellular wireless communication link. In this embodiment, the locally stored identifier information may then be modified according to the instruction.

In another embodiment, diagnostic information may also be collected about a vehicle in which the recipient receiver is located. In such an embodiment, the processing of the datagram may include a determination as to whether information in the datagram relates to the collected diagnostic information, and if so, presenting the information of the datagram relating to the diagnostic information to a user of the recipient receiver.

In a further embodiment, a modified portion of the locally stored identifier information may define at least one segment of receivers in the satellite radio network to which the recipient receiver is a member. In an additional embodiment, the datagram may include audio information and the processing of the datagram may include presenting the audio information of the datagram utilizing an audio component coupled to the recipient receiver. In a further embodiment, the datagram may include visual information that may be presented utilizing a visual component coupled to the recipient receiver during the processing of the datagram.

In an embodiment of the present invention, the processing of the received datagram may include making a determination as to whether a copy of datagram has been previously stored in a memory of the recipient receiver. In an aspect of such embodiment, the broadcast identifier information of the received datagram may includes a data identifier (such as, e.g., a serial number) associated with content of the datagram. In this aspect, the data identifier of the received datagram may be compared with the data identifiers of datagrams already stored in the memory of the recipient receiver to determine whether a copy of the datagram has been previously stored in the memory. As a further option, data identifier of the received datagram may include information for indicating to the recipient receiver whether the previously stored copy of the datagram needs to be updated (i.e., replaced with the received datagram) or deleted from memory.

Figure 2:
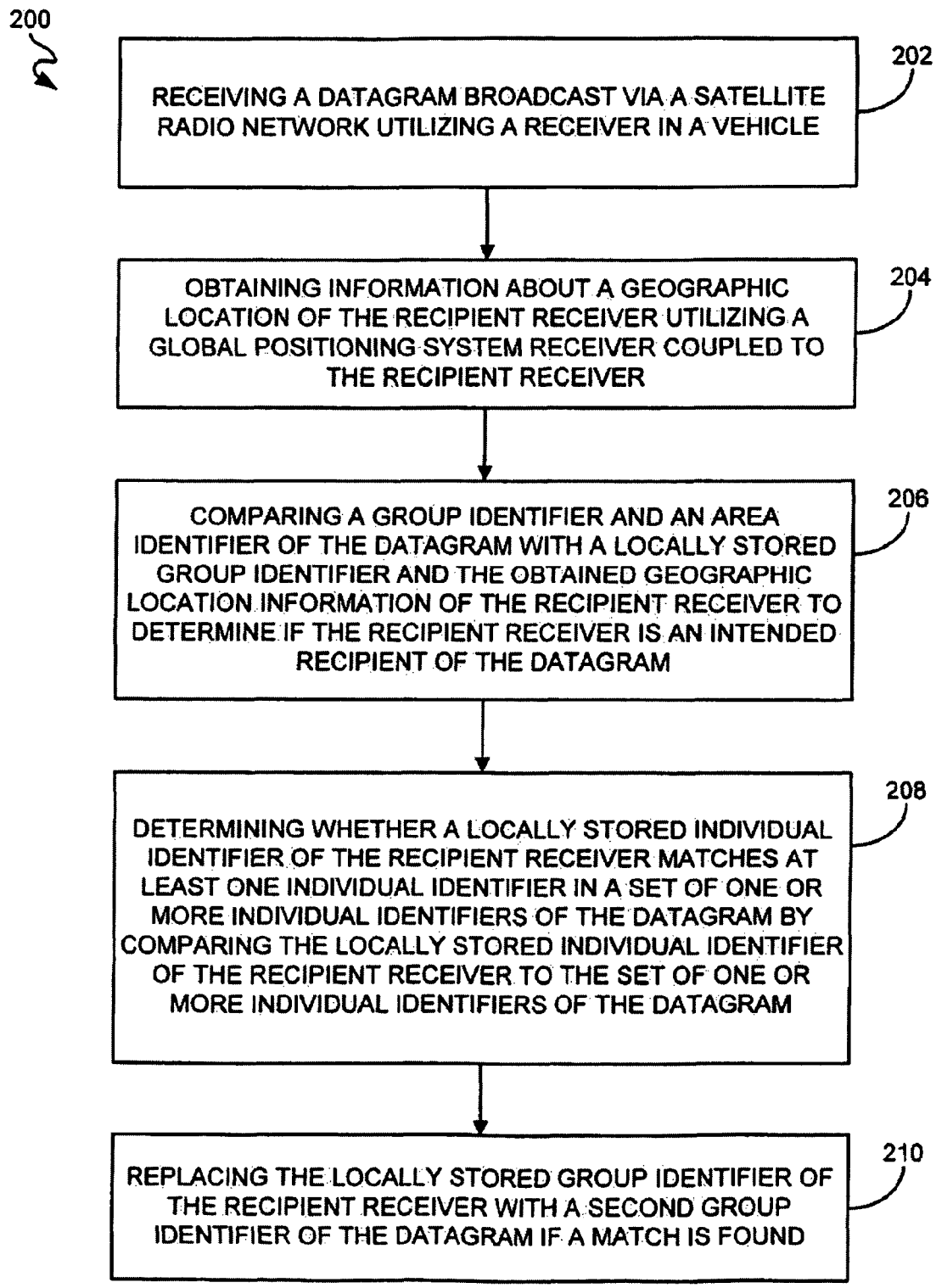
FIG. 2 is a flowchart of a process for receiving data from a satellite radio network in accordance with an embodiment of the present invention.

FIG. 2 is a flowchart of a process 200 for receiving data from a satellite radio network in accordance with an embodiment of the present invention. In operation 202, a datagram broadcast via a satellite radio network may be received utilizing a receiver in a vehicle. The datagram may have a header portion that includes a first group identifier identifying a group of one or more receivers in the satellite radio network to which the datagram is directed, and an area identifier identifying a geographic area in which the datagram is directed. In operation 204, information about a geographic location of the recipient receiver may be obtained utilizing a global positioning system receiver coupled to the recipient receiver.

In this embodiment, the receiver may have a locally stored individual identifier and a locally stored group identifier associated therewith and which are stored in a memory coupled to the receiver. To determine if the recipient receiver is an intended recipient of the datagram, the group identifier and the area identifier of the datagram may be compared to the locally stored group identifier and obtained geographic location information of the recipient receiver in operation 206.

The datagram may also have a body portion that includes a set of one or more individual identifiers of receivers in the satellite radio network and an instruction for replacing the locally stored group identifiers of the receivers identified by the set of one or more individual identifiers with a second group identifier. In operation 208, a comparison of the locally stored individual identifier of the recipient receiver to the set of one or more individual identifiers of the datagram may then be performed to determine whether the locally stored individual identifier of the recipient receiver matches at least one individual identifier in the set of one or more individual identifiers of the datagram. If a match is found, then the locally stored group identifier of the recipient receiver may be replaced with the second group identifier of the datagram in operation 210.

Figure 3:
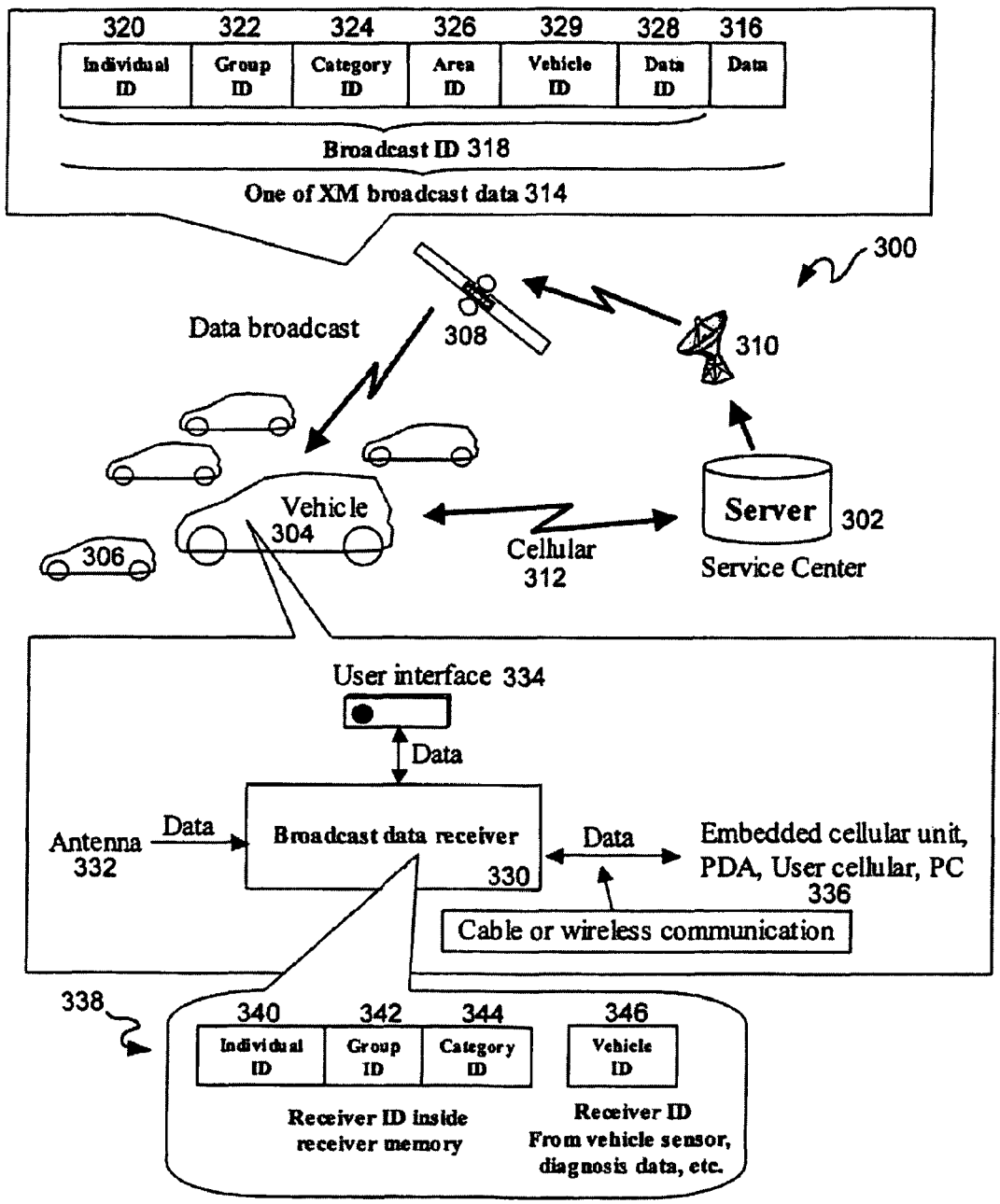
FIG. 3 is a schematic diagram of a system for delivering and receiving data broadcast via a satellite radio network in accordance with an embodiment of the present invention.

FIG. 3 is a schematic diagram of system 300 for carrying out embodiments of the present invention. System 300 comprises a satellite radio network that provides for satellite radio transmissions of data from one node (e.g., server 302) to one more other nodes (e.g., vehicles 304 and 306). The satellite radio network may include orbiting satellites 308 and Earth located satellite transmitters 310. The satellite radio network may also include terrestrial repeaters (including non-line of sight repeaters) capable of receiving and retransmitting the datagram in order to facilitate reliable reception in geographic areas where line of sight reception from the satellites 308 may be obstructed. As an option, a cellular wireless link 312 may also be available between a vehicle 304 and another node 302.

The data being transmitted may comprise one or more datagrams (i.e., packets of data). FIG. 3 also illustrates an exemplary embodiment of a datagram 314. Datagram 314 may comprise a header and a body portion (or data portion) 316. The header of the datagram may include a broadcast identifier (broadcast ID) 318. The broadcast identifier 318 may comprise one or more of the following identifiers including, for example: an individual identifier (individual ID) 320, a group identifier (group ID) 322, a category identifier (category ID) 324, an area identifier (area ID) 326, a data identifier (data ID) 328, and a vehicle identifier (vehicle ID) 329.

The individual identifier 320 may identify an individual node or receiver in the satellite radio network to which the datagram 314 is directed. In an exemplary embodiment, the individual identifier 320 may comprise or relate to a serial number of particular receiver. Thus, if the datagram 314 is targeted for a single specific recipient, a sender (e.g., server 302) may include the individual identifier 320 in the broadcast identifier 318 of the datagram 314.

The group identifier 322 may define a group of nodes for which the datagram 314 is directed. In an illustrative embodiment, some examples of possible groups which may be defined by the group identifier 322 include: a model year of a vehicle (e.g., 2003, 2002, 2001, etc.), a particular model or vehicle type (e.g., Acura RL, Acura TL, Honda Accord, Honda CR-V, etc.), a feature or variation included in a vehicle (e.g., vehicles that include an onboard navigation system such as a NAVI brand system or OnStar brand system), a service area (e.g., Torrance Acura, Detroit Honda, etc.), the maintenance history of a vehicle (e.g., whether or not a vehicle has been repaired in response to a vehicle recall), and a geographic location in which an owner (or other user) of the vehicle resides (e.g., Los Angeles, Torrance, San Francisco, etc.). With a group identifier 322 included in the broadcast identifier 318 of single datagram 314, a sender may direct the datagram 314 to a specific set of receivers that are members of the group associated with the group identifier 322.

In one embodiment, the broadcast identifier 318 may include a plurality of group identifiers 322 to define a subgroup of a particular group. For example, a group identifier associated with vehicles of model year 2002 and a group identifier associated with Honda Accord model vehicles may be both included in the broadcast identifier 318 of a datagram 314 to direct the datagram 314 to 2002 Honda Accord vehicles. In a specific aspect of this embodiment, the group identifiers 322 may be combined in the broadcast identifier 318 with the user of an "AND" function in the broadcast identifier (e.g., group identifier for 2002 model year vehicles AND group identifier for Honda Accords).

The category identifier 324 may identify a particular category of which the datagram 314 is associated. The category identifier 324 may provide general information about the contents of the data 316 included in the datagram 314. For example, the category identifier 324 may be indicate that the contents of the datagram 314 relate to a service reminder for the vehicle, news information, an advertisement and so on.

The inclusion of a category identifier 324 in the broadcast identifier 318 may be used to help a user to selectively filter datagrams targeted to the user which are received by the user's receiver. For example, the user may select to not receive datagrams that include advertisements (which are identified as advertisements by their category identifier). As a result, the user's receiver may be able to filter out the datagrams containing advertisements by simply comparing the category identifier 324 of the received datagram with a stored list of category identifiers that the user does not want to receive.

The area identifier 326 may define a particular geographic location, region or area (e.g., Minneapolis, California, Eastern USA, etc) to which the datagram 314 is directed. Thus, if the datagram 314 is targeted for all nodes located in a specific geographic location, region or area, a sender may include the area identifier 326 in the broadcast identifier 318 of the datagram 314.

The data identifier 328 may identify the contents of the datagram 314 (i.e., the data 316 in the body of the datagram). In one embodiment, the data identifier 328 may be a serial number associated with the contents of the datagram 314. The data identifier 328 may also include version information about the contents of the datagram 314 which may be used to determine whether the contents of the datagram 314 are an updated version of a previously received datagram.

The vehicle identifier 329 may indicate a current condition of vehicles to which the datagram is directed. For example, the vehicle identifier 329 may be utilized to direct a datagram 314 to vehicles having an odometer reading between 7400 miles and 7600 miles. The receiver 330 then be able to filter the datagram by comparing the vehicle identifier to information about the condition or status of its associated vehicle 304 (e.g., the odometer reading of the vehicle 304) to determine if the receiver 330 is an intended recipient of the datagram 314.

FIG. 3 further illustrates a satellite radio network receiver 330 for receiving datagrams 314 broadcast via the satellite radio network. Receiver 330 may be included in at least a portion of the nodes in the satellite radio network (e.g., vehicles 304 and 306). Receiver 330 may have an antenna 332 coupled thereto for aiding reception of a datagram 314 broadcast via the satellite radio network. A user interface 334 may also be coupled to the receiver 330 to facilitate user control and interaction therewith and for presenting information associated with received datagram 314 to the user. The receiver 330 may also be in communication with other devices/components 336 (e.g., an embedded cellular unit, personal digital assistant (PDA), a user's cellular phone/device, a computer, etc.) for permitting transmission of data therebetween.

Receiver 330 also has locally stored identifier information 338 which may be stored in a memory of the receiver 330. In one embodiment, the locally stored identifier information 338 may comprise a locally stored individual identifier 340 associated with the receiver 338, one or more locally stored group identifiers 342 associated with the receiver and, as a further option, one or more locally stored category identifiers 344 associated with the receiver 330. In an exemplary embodiment, the locally stored individual identifier 340 may be a unique serial number associated with the receiver 330. The one or more locally stored group identifiers 342 of the receiver 330 identify the groups of which the receiver 330 is a member or with which the received is associated. The one or more locally stored category identifiers 344 identify the categories or subjects of data that the user is interested in receiving and/or wishes not to receive. As an option, the locally category identifiers 344 may be selected by a user from a set of category identifiers provided by the receiver 330 and/or the locally category identifiers 344 may be defined by the user. The user may carry out this selection and/or defining of the locally stored category identifiers 344 via the user interface 334.

As a further option, the locally stored identifier information 338 may further comprise a locally stored vehicle identifier 346 that is associated with a current condition of the vehicle 304. The locally stored vehicle identifier 346 may be generated based on information pertaining to the status or current condition of the vehicle 304 collected by sensors and detectors in the vehicle 304 in communication with the receiver 330. For example, mileage information collected from the vehicle's odometer may be used to generate a corresponding locally stored vehicle identifier 346. The receiver 330 may then compare the locally stored vehicle identifier 346 with the vehicle identifier 329 in a received datagram 314 to determine if the datagram is directed at the receiver 330 of the vehicle 304.

include which may be stored in a memory of the receiver 330. In one embodiment, the locally stored identifier information 338 may comprise a locally stored individual identifier 340 associated with the receiver 338, one or more locally stored group identifiers 342 associated with the receiver and, as a further option, one or more locally stored category identifiers 344 associated with the receiver 330. The vehicle identifier 329 may define a particular group of vehicles based on a current condition of the vehicle. For example, the vehicle identifier 329 may be utilized to direct a datagram 314 to vehicles having an odometer reading between 7400 miles and 7600 miles. The receiver 330 then be able to filter the datagram by comparing the vehicle identifier to information about the condition or status of its associated vehicle 304 (e.g., the odometer reading of the vehicle 304) to determine if the receiver 330/vehicle 304 is an intended recipient of the datagram 314.

Receiver 330 may also be adapted for obtaining information corresponding to a current (or at least near-current) geographic location of the receiver 330. In one embodiment, geographic location information may be obtained utilizing a global positioning system (GPS). For example, the recipient receiver 330 may have a GPS receiver coupled thereto that is capable of receiving GPS information from a GPS transmitter (such as, e.g., a GPS satellite) or, as another option, directly from a satellite in the satellite radio network (e.g., satellite 308). As an option, the receiver 330 may correlate the obtained geographic location to an area identifier pre-associated with the geographic location from a local database of area identifiers and their corresponding pre-associated geographic locations. In such an embodiment, the correlated area identifier may be compared with an area identifier 326 of a received datagram 314 to determine if the area identifiers match and, if they match, indicate that receiver 330 is in a geographic location for which the datagram 314 is directed.

With continuing reference to FIG. 3, server 302 may include logic for generating the broadcast identifier 318 included in a datagram 314 and thereby permit a user (via a user interface coupled to the generating logic of the server 302) to define the segment of receivers in a satellite radio network to which the datagram 314 is directed identified by the broadcast identifier 318. Once the broadcast identifier of a datagram has been defined, the datagram can be broadcast over the satellite radio network via a transmitter (e.g., transmitter 310) coupled to the server 302. Server 302 may also include logic adapted for receiving notifications sent by the targeted receivers (i.e., receivers in the segment of receivers for which the datagram is directed). In an exemplary embodiment, the notifications may be transmitted via the cellular wireless communication link 312. In one embodiment, the notifications may indicate that the responding receivers have received the datagram (i.e., a confirmation of receipt). In embodiments where the datagram 314 includes an instruction to modify locally stored identifier information in the targeted receivers, the notification may be sent to the server 302 after modification of the locally stored identifier information in the responding receiver. Server 302 may also maintain a database of information relating to at least a portion of the receivers in the satellite radio network. This database may be updated upon receipt of the notifications sent by the receivers.

Through the use of embodiments of the system 300 set forth in FIG. 3, a datagram 314 directed to a selected segment of receivers may be sent in a single broadcast over the satellite radio network. However, since it is possible to imagine situations where an intended receiver is turned off or otherwise not able to receive datagrams broadcasted via the satellite radio network, it may be necessary to transmit the datagram more than once (i.e., multiple times) over a period of time and/or at different times in a day.

Figure 4:
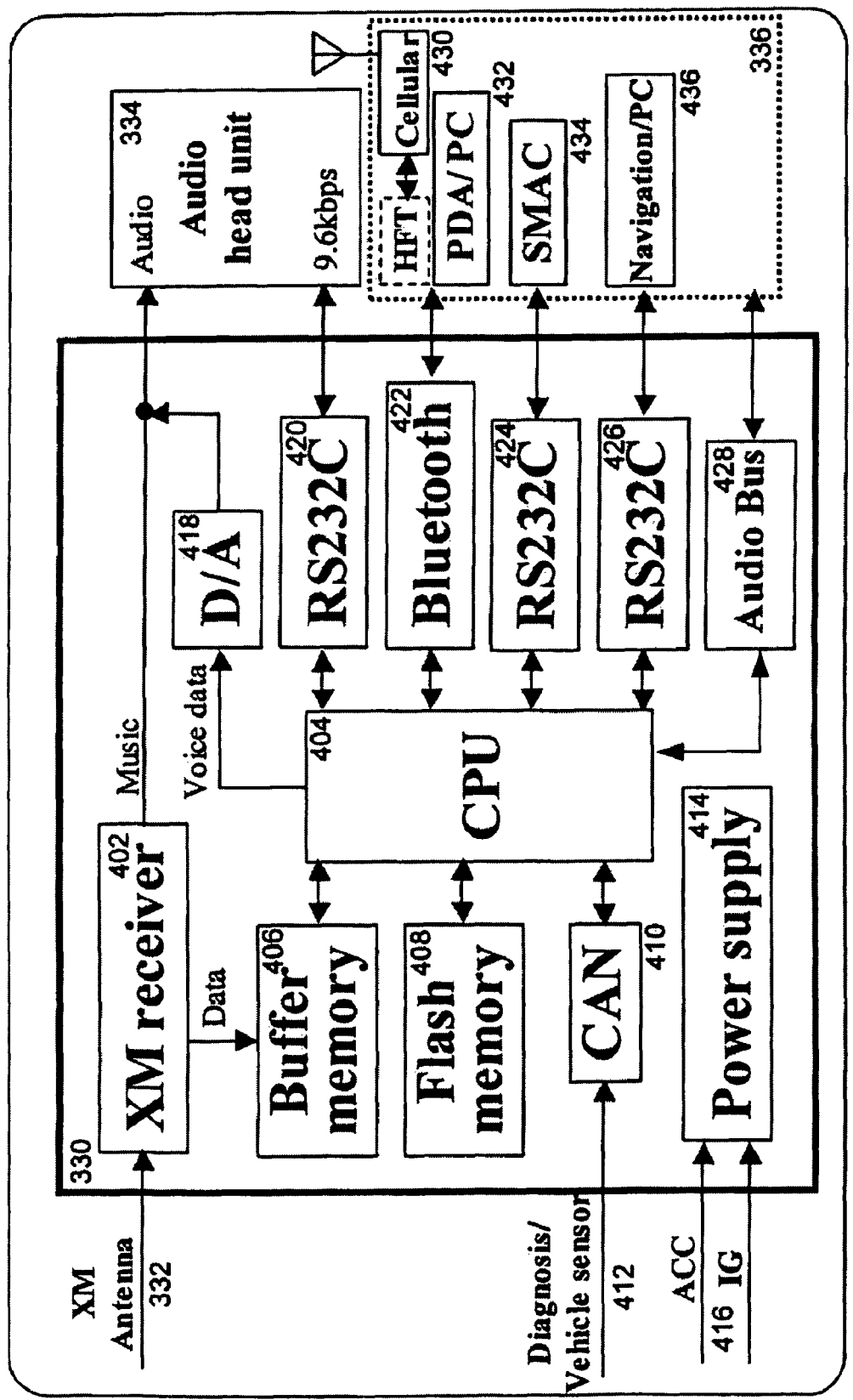
FIG. 4 is a schematic diagram of an exemplary receiver in accordance with an illustrative embodiment of the present invention.

FIG. 4 is a schematic diagram of an exemplary receiver 330 in accordance with an illustrative embodiment of the present invention. In this illustrative embodiment, satellite radio antenna 332 may be coupled to a satellite radio receiver component 402 adapted for receiving datagrams broadcast via a satellite radio network. Satellite radio receiver component 402 may be coupled to the user interface 334 which may be, for example, an vehicular audio head unit for providing data (such as, e.g., audio information) to the user interface 334.

Exemplary receiver 330 may also include a processor (e.g., central processing unit (CPU)) 404. Satellite radio receiver component 402 may be coupled to the processor 404 for providing data received by the satellite radio receiver component 402 to the processor 404. As an option, receiver 330 may also have a buffer memory 406 interposed between the processor 404 and satellite radio receiver component 402 for temporarily storing data being transmitted from the satellite radio receiver component 402 to the processor 404. Receiver 330 may also have local memory 408 coupled to the processor 404 for storing data therein. In an exemplary embodiment, local memory 408 may be of a type of memory capable of storing data even when power to the receiver 330 is turned off. In one embodiment, the local memory 408 may comprise a flash type of memory. Local memory 408 may store therein local identifier information of the receiver 330, text message data and voice message data with message identifier information, software for operating and controlling the receiver 330. In one embodiment, when local memory becomes full, data stored therein may be automatically deleted starting with oldest data (the data that has been stored the longest) first. In addition, receiver 330 may permit data stored in local memory to be read, rewritten, deleted from data received from the other components 336 coupled to the receiver 330.

With continuing reference to FIG. 4, receiver 330 may also have a sensor interface 410 for coupling the receiver 330 to diagnostic and other sensors 412 in the hosting vehicle (e.g., vehicle 304) to permit transmission of diagnostic, status and other data about the vehicle collected by the sensors 412 to the receiver 330. In an illustrative embodiment, the sensor interface 410 may comprise a Control Area Network bus (CAN-bus).

Receiver 330 may have a power supply 414 that is coupled to an external power supply 416. In an exemplary embodiment where the receiver 330 resides in a vehicle, the external power supply 416 may include an ignition power supply (IG) and/or an accessory power supply (ACC). In an illustrative exemplary embodiment of the receiver 330 illustrated in FIG. 4, receiver 330 may be activated by turning on power supply (IG and/or ACC) 416 upon which time the receiver 402 may be set to receive data from satellite radio network broadcasts. The receiver 330 may save received data while simultaneously receiving satellite radio music and data. As an option, the receiver 330 may be able to temporarily cancel satellite radio network data reception and saving process when downloading software onto the memory of the receiver 330 and/or when the receiver 330 is performing large amounts of processing (i.e., heavy processing).

As illustrated in FIG. 4, receiver 330 may also include a plurality of interfaces 418, 420, 422, 424, 426, 428 for coupling the receiver 330 to the user interface 334 and other components 336 in the hosting vehicle (e.g., vehicle 304). In an exemplary embodiment, interfaces may include serial interfaces (e.g., RS232C interfaces 420, 424, 426) and other interfaces (e.g., audio interfaces 418 and 428 and Bluetooth interface 422). In the illustrated exemplary embodiment, audio interface 428 may comprise an audio bus for aiding control of audio portions of user interface 334. Additionally in this exemplary embodiment, components 336 may include a cellular communication component 430 for cellular wireless communication, a computer component 432 (e.g., a PDA and/or PC), a subscriber mobile assistance component (SMAC) 434 (e.g., an OnStar system component), and a navigation/location component 436 (which may also include a personal computer element) for providing navigational and location information to a user (e.g., GPS component, NAVI brand navigation system, etc.).

In an exemplary embodiment, the user interface 334 may be utilized to display textual information and voice message replay functions. Via the user interface 334, a user may be able to control information handled by the receiver 330 such as controlling the selecting and displaying of text messages and open display of messages, selecting and replaying or canceling of voice messages, and controlling voice output via "text to speech" and voice output via "MP3" data replay.

In such an illustrative embodiment, receiver 330 may received inputs from via cellular component 430 via interface 422. These inputs may include point of interest (POI) information, software downloads, and message data. Via the interface 422, the receiver 330 may output to the cellular component 430 information such as telephone numbers, identifier information to confirm reception of satellite radio network data, vehicle diagnosis/sensor data and other forms of message data suitable for transmission via a cellular wireless communication link. Cellular component 430 may also be utilized to receive software updates and additional support relating to release data compression, data coding, voice data replay formats, cellular/PDA/PC communication formats, vehicle diagnosis/sensor data input formats and timing changes, and navigation component 436 updates.

Via interface 424, receiver 330 may receive POI information from the subscriber mobile assistance component 434 and output information similar to that output to the cellular component 430 but suitable for transmission via the subscriber mobile assistance component 434. Receiver 330 may receive via interface 426 POI information and software downloaded by navigation/location component 436 while providing the navigation/location component 436 information obtained from the satellite radio network data and the cellular component 430.

Figure 5:
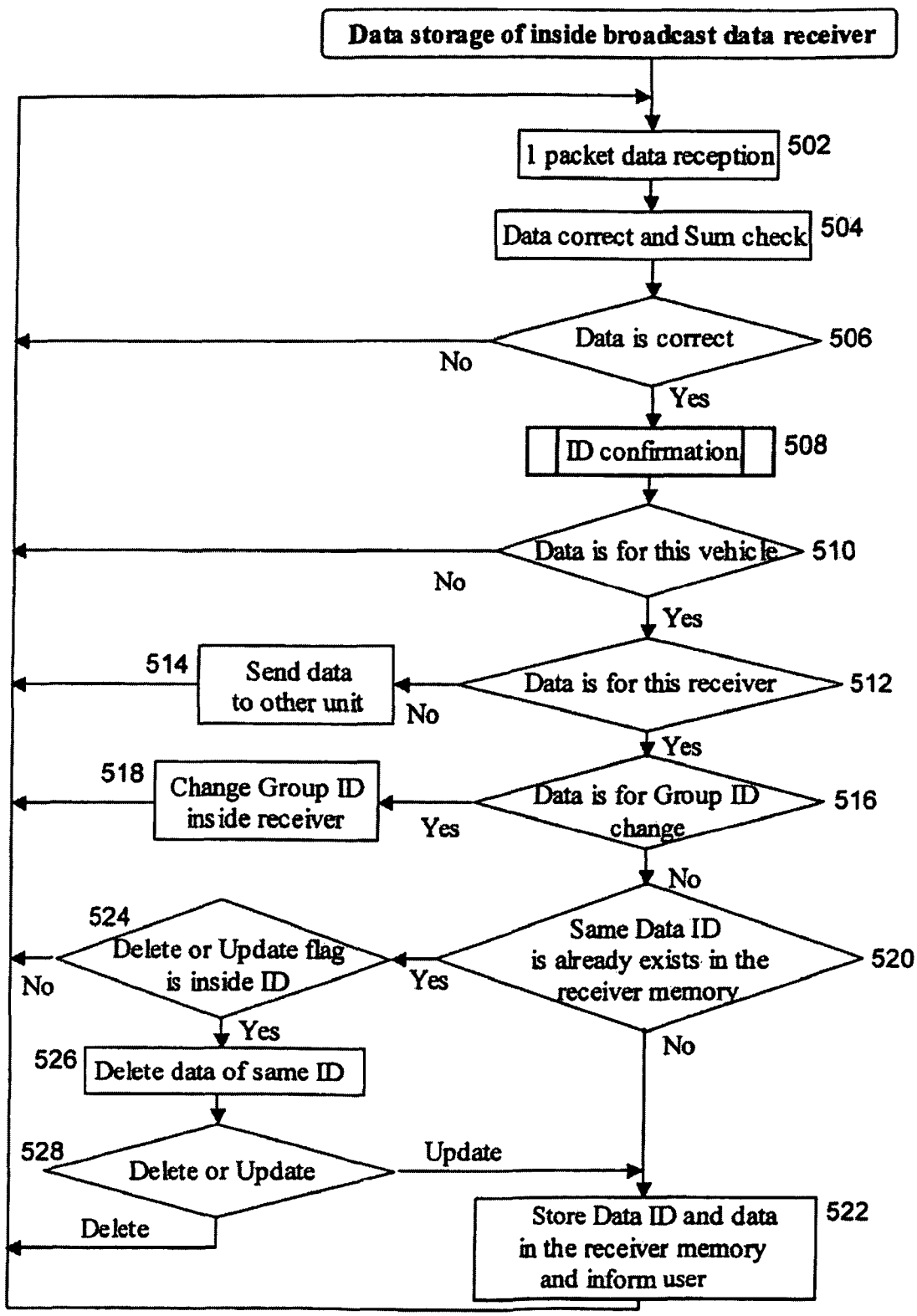
FIG. 5 is a flowchart of a process for receiving data broadcast via a satellite radio network in accordance with an exemplary embodiment of the present invention.

FIG. 5 is a flowchart of a process for receiving and storing data broadcast via a satellite radio network in accordance with an exemplary embodiment of the present invention. When a packet of data (i.e., a datagram) is broadcast via a satellite radio network, the received data may first be checked for errors (see operations 502, 504, 506). After error checking, the broadcast identifier information of the received data packet is confirmed and compared with locally stored identifier information of the receiver to determine if the data packet is directed at the receiving vehicle and receiver (see operations 508, 510, 512). If the received data packet is intended for another component in the vehicle (that is in communication with the receiver), the data packet may be forwarded to the intended component in operation 514. In operation 516, the received data packet is analyzed to determine if it contains instructions for changing a locally stored group identifier associated with the receiver, and if so, the locally stored group identifier of the receiver is changed according to the instructions of the received data packet in operation 518.

The broadcast identifier information of received data packet may also be analyzed to determine if a data identifier of the received data packet matches a data identifier of a data packet already stored in the memory of the receiver in operation 520. If no match to the data identifier of the received data packet can be found in the memory of the receiver, then the received data packet is stored in the memory in operation 522. On the other hand, if the data identifier of the received data packet is determined to match a data identifier of a data packet already stored in the memory of the receiver, then a determination is made as to whether the locally stored version of the data packet is to be deleted or updated by the received data packet (see operations 524, 526, 528). In the exemplary embodiment, received data packet may be analyzed to determine if it contains a delete or update flag in order to determine whether the locally stored version of the data packet is to be deleted or updated by the received data packet.

FIG. 6 is a depiction of three exemplary scenarios 602, 604, 606 for identifier confirmation (operation 508) in determining whether a received data packet is directed at the recipient receiver in accordance with an embodiment of the present invention.

In the first scenario 602, the broadcast identifier information of the received data packet may include both a group identifier and an area identifier. If both the group identifier and the area identifier of the received data packet match a group identifier and area identifier locally stored in the recipient receiver, then the data packet is determined to be directed at the recipient receiver and vehicle. If either or both identifiers of the data packet do not match the locally stored group identifier and area identifier, then the data packet is determined to not be directed at the recipient receiver and vehicle. As previously set forth, the locally stored area identifier may be derived from location data obtained from a GPS or the broadcasting satellite.

In the second scenario 604, the broadcast identifier information of the received data packet may include either a group identifier or an area identifier (but not both). If either the group identifier and the area identifier of the received data packet match the locally stored group identifier and the area identifier respectively, then the data packet is determined to be directed at the recipient receiver and vehicle. If neither identifiers of the data packet match the locally stored group identifier and area identifier, then the data packet is determined to not be directed at the recipient receiver and vehicle.

In the third scenario 606, the broadcast identifier information of the received data packet may include an individual identifier that identifies a single intended receiver for the data packet. In this scenario 606, the individual identifier of the data packet is compared to a locally stored individual identifier of the recipient receiver that may be uniquely associated with the receiver. If the individual identifiers match, then the data packet is determined to be directed to the recipient receiver and vehicle. If the individual identifiers do not match, then the data packet is determined to not be directed at the recipient receiver and vehicle.

Figure 7:
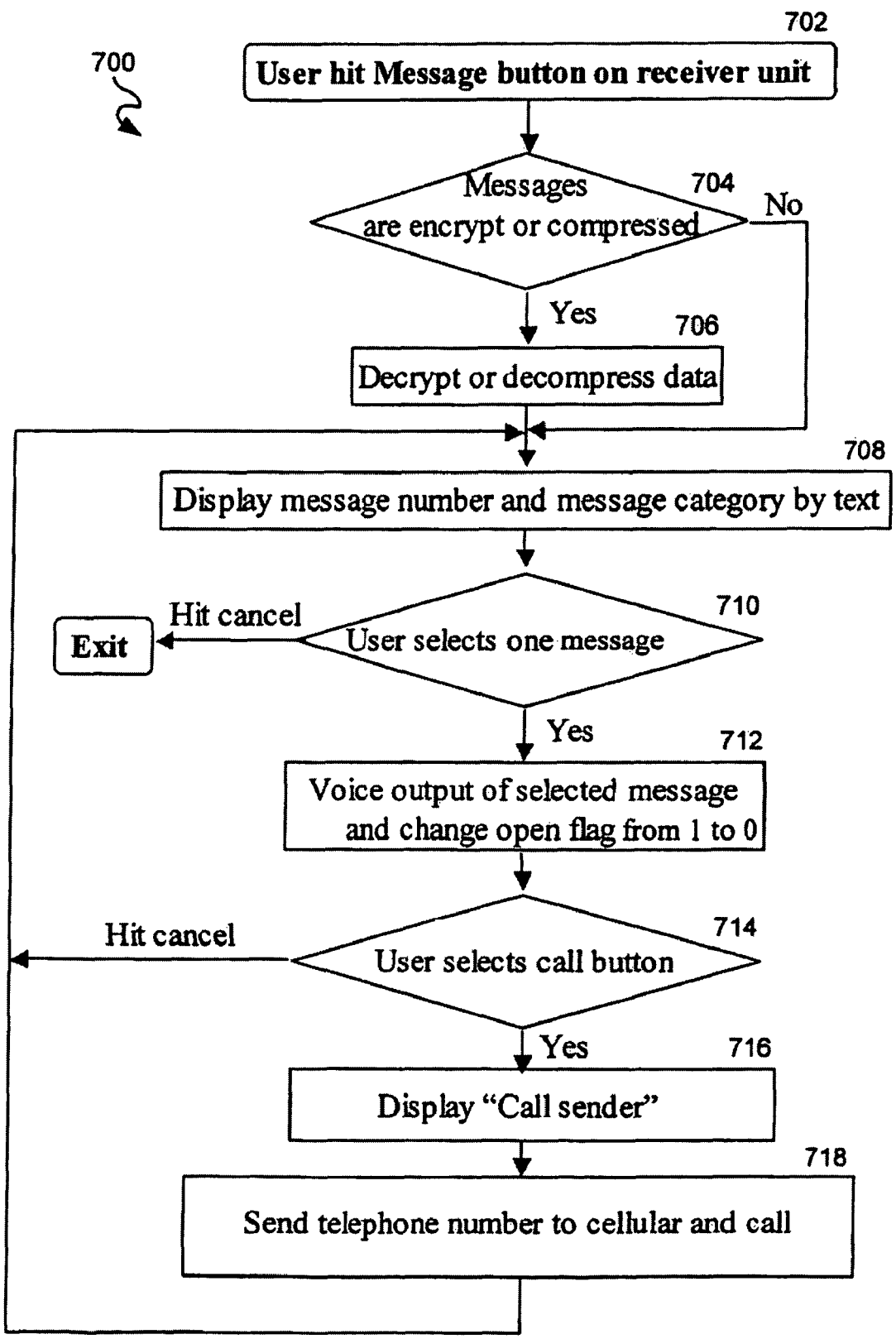
FIG. 7 is a flowchart of a process for enabling communication between a receiver receiving a datagram broadcast via a satellite radio network and a remote location in accordance with an embodiment of the present invention.

FIG. 7 is a flowchart of a process 700 for enabling communication between a receiver receiving a datagram broadcast via a satellite radio network and a remote location such as a service center in accordance with an embodiment of the present invention. In process 700, messages to a user may be transmitted via datagrams received by the satellite radio network receiver (e.g., receiver 330). In operation 702, a user may issue a command to the receiver via a user interface (e.g., via user interface 334) to review messages sent to the user via the satellite radio network. Upon issuance of the command, information relating to the message(s) may be obtained from the receiver and presented to the user via the user interface (see operations 704, 706, 708). Process 700 may also include operations for decrypting the message is it is determined to be encrypted (see operations 704, 706). If there are a plurality of messages, a listing of the messages may be presented to the user.

The user may then select for review one of the messages from the listing of messages in operation 710 and the selected message may then be presented either visually or audibly to the user (see operation 712). If the selected message indicates that the user needs to contact a remote location such as, for example, a service center, the user may then issue a command to contact (via a cellular communication) the remote location via the user interface (see operation 714). Upon issuing of this command, the receiver may then retrieve a telephone number associated with the remote location that was stored with or as part of the message in the local memory of the receiver and then initiate a cellular communication link with the remote located using the retrieved telephone number and a cellular communication transmitter/receiver coupled to the receiver (e.g., cellular communication component 430) (see operations 716, 718). The process set forth in FIG. 7 may be utilized to permit changing of a group identifier of a receiver via cellular wireless communication link. In such an embodiment, after the remote location has been contacted, the remote location could issue a group identifier change command via the cellular wireless communication link in a manner similar to that previously set forth.

In an embodiment of the present invention, the satellite radio network may comprise a satellite digital audio radio service (SDARS) network such as that provided by XM Satellite Radio (formerly American Mobile Radio) and Sirius Satellite Radio (formerly CD Radio). These satellite radio networks function in a spectrum in the S band allocated by the FCC for digital satellite radio transmissions. Another satellite digital audio radio service provided by WorldSpace provided satellite radio broadcasts in other regions of the world such as Asia and Africa. An exemplary embodiment of a satellite digital audio radio service network is set forth in U.S. Pat. No. 6,510,317 to Marko et al. entitled, "Satellite Digital Audio Radio Service Tuner Architecture for Reception of Satellite and Terrestrial Signals." In particular, an exemplary satellite radio network may include a plurality of geostationary satellites which transmit line-of-sight signals to satellite radio receivers. The satellites may provide for interleaving and spatial diversity however, the signals from the two satellites could be delayed to provide time diversity. The satellite radio network may also include a plurality of terrestrial repeaters (including non-line of sight repeaters) may also be which receive and retransmit the satellite signals to the satellite radio receivers in order to facilitate reliable reception in geographic areas where line of sight reception from the satellites is obscured by tall buildings, hills, tunnels and other obstructions. The satellite receivers may be located in automobiles, handheld units, and/or stationary units.

A Global Positioning System (GPS) comprises a number of satellites orbiting the Earth that make it possible for user with GPS receivers to pinpoint their geographic location. In general, the satellites may be spaced apart so that from any point on Earth, four satellites will be above the horizon. Each satellite contains a computer, an atomic clock, and a radio. With an understanding of its own orbit and the clock, the satellite continually broadcasts its changing position and time. (Once a day, each satellite checks its own sense of time and position with a ground station and makes any minor correction.) The GPS receiver includes a computer that "triangulates" its own position by getting bearings from three of the four satellites. The result is provided in the form of a geographic position in longitude and latitude. A GPS receiver may also be equipped with a display screen that shows a map so that the receiver's position can be shown on the map. In addition, if a fourth satellite may be received, the receiver/computer may be able to calculate the altitude of the receiver.

In the present description, the various sub-components of each of the components may also be considered components of the system. For example, particular software modules executed on any component of the system may also be considered components of the system. Components of embodiments of the present invention may be implemented on computers having a central processing unit such as a microprocessor, and a number of other units interconnected via a bus. Such computers may also include Random Access Memory (RAM), Read Only Memory (ROM), an I/O adapter for connecting peripheral devices such as, for example, disk storage units and printers to the bus, a user interface adapter for connecting various user interface devices such as, for example, a keyboard, a mouse, a speaker, a microphone, and/or other user interface devices such as a touch screen or a digital camera to the bus, a communication adapter for connecting the workstation to a communication network (e.g., a data processing network) and a display adapter for connecting the bus to a display device. The workstation may utilize an operating system such as, for example, a Microsoft Windows Operating System (OS), a Macintosh OS, a Linux OS and/or a UNIX OS. Those skilled in the art will appreciate that the present invention may also be implemented on platforms and operating systems other than those mentioned. Embodiments of the present invention may also be implemented using computer program languages such as, for example, ActiveX, Java, C, and the C++ language and utilize object oriented programming methodology.

Transmission Control Protocol/Internet Protocol (TCP/IP) is a basic communication language or protocol of the Internet. It can also be used as a communications protocol in the private networks called intranet and in extranet. TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (IP), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received.).

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPP) and Microsoft has extended Windows NT to support it. VPN software is typically installed as part of a company's firewall server.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing. Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

Bluetooth is a computing and telecommunications industry specification that describes how mobile phones, computers, and personal digital assistants (PDA's) can easily interconnect with each other and with home and business phones and computers using a short-range wireless connection. Each device is equipped with a microchip transceiver that transmits and receives in a previously unused frequency band of 2.45 GHz that is available globally (with some variation of bandwidth in different countries). In addition to data, up to three voice channels are available. Each device has a unique 48-bit address from the IEEE 802 standard. Connections can be point-to-point or multipoint. The maximum range is 10 meters. Data can be presently be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Encryption is the conversion of data into a form, called a ciphertext, that cannot be easily understood by unauthorized people. Decryption is the process of converting encrypted data back into its original form, so it can be understood.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key may be used to decrypt text that has been encrypted with the public key. For example, to send a message to a recipient, a sender first obtains the recipient's public key (but not the recipient's private key) from a central administrator and encrypt the message using the recipient's public key. When the recipient receives the encrypted message from the sender, the recipient may then decrypt the encrypted message with the recipient's private key. In addition to encrypting messages (which ensures privacy), senders may also authenticate themselves to recipients (so that the recipient can verify the identity of the sender) by using the sender's own private key to encrypt a digital certificate. When the recipient receives the digital certificate, the recipient can use the sender's public key to decrypt it.

The Secure Sockets Layer (SSL) is a commonly-used protocol for managing the security of a message transmission on the Internet. SSL has recently been succeeded by Transport Layer Security (TLS), which is based on SSL. SSL uses a program layer located between the Internet's Hypertext Transfer Protocol (HTTP) and Transport Control Protocol (TCP) layers. SSL uses the public-and-private key encryption system from RSA, which also includes the use of a digital certificate. A SSL protocol is described in the SSL Protocol Version 3.0 by the Transport Layer Security Working Group, Nov. 18, 1996 for providing communications privacy over the Internet and allowing client/server applications to communicate in a way that is designed to prevent eavesdropping, tampering, or message forgery, the disclosure of which is incorporated herein by reference in its entirety.

Transport Layer Security (TLS) is a protocol that ensures privacy between communicating applications and their users on the Internet. When a server and client communicate, TLS ensures that no third party may eavesdrop or tamper with any message. TLS is a successor to the Secure Sockets Layer (SSL). TLS is composed of two layers: the TLS Record Protocol and the TLS Handshake Protocol. The TLS Record Protocol provides connection security with some encryption method such as the Data Encryption Standard (DES). The TLS Record Protocol can also be used without encryption. The TLS Handshake Protocol allows the server and client to authenticate each other and to negotiate an encryption algorithm and cryptographic keys before data is exchanged. The TLS protocol is based on Netscape's SSL 3.0 protocol; however, TLS and SSL are not interoperable. The TLS protocol does contain a mechanism that allows TLS implementation to back down to SSL 3.0. A TLS protocol is described in the document entitled, "The TLS Protocol, Version 1" by the Network Working Group of the Internet Society, 1999, the disclosure of which is incorporated herein by reference in its entirety. This document specifies Version 1.0 of the Transport Layer Security (TLS) protocol. The TLS protocol provides communications privacy over the Internet. The protocol allows client/server applications to communicate in a way that is designed to prevent eavesdropping, tampering, or message forgery.

Wireless Transport Layer Security (WTLS) is the security level for Wireless Application Protocol (WAP) applications. Based on Transport Layer Security (TLS) v1.0 (a security layer used in the Internet, equivalent to Secure Socket Layer 3.1), WTLS was developed to address the problematic issues surrounding mobile network devices—such as limited processing power and memory capacity, and low bandwidth—and to provide adequate authentication, data integrity, and privacy protection mechanisms.

The Wired Equivalent Privacy (WEP) algorithm, is part of the 802.11 standard. The 802.11 standard describes the communication that occurs in wireless local area networks (LANs). The Wired Equivalent Privacy (WEP) algorithm is used to protect wireless communication from eavesdropping. A secondary function of WEP is to prevent unauthorized access to a wireless network; this function is not an explicit goal in the 802.11 standard, but it is frequently considered to be a feature of WEP. WEP relies on a secret key that is shared between a mobile station (e.g. a laptop with a wireless Ethernet card) and an access point (i.e. a base station). The secret key is used to encrypt packets before they are transmitted, and an integrity check is used to ensure that packets are not modified in transit. The standard does not discuss how the shared key is established. In practice, most installations use a single key that is shared between all mobile stations and access points.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer sub-system embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for receiving data from a satellite radio network, comprising:

receiving at a first receiver a packet of data comprising a header portion and a body portion broadcast via a satellite radio network, wherein the header portion of the packet of data includes broadcast identifier information that is associated with a selected set of receivers configured to receive the broadcast that are intended recipients of the packet of data;

wherein the selected set of receivers configured to receive the broadcast are identified based on the broadcast identifier information included in the header;

comparing the selected set of receivers configured to receive the broadcast to locally stored identifier information associated with the first receiver to determine if the first receiver is a member of the selected set of receivers configured to receive the broadcast that are intended recipients of the packet of data using the broadcast identifier information; and processing the packet of data if the first receiver is determined to be a member of the selected set of receivers configured to receive the broadcast that are intended recipients of the packet of data.

2. The method of claim 1, wherein the first receiver is located in a vehicle.

3. The method of claim 1, wherein the locally stored identifier information associated with the first receiver includes one or more of an individual identifier, a group identifier, and a category identifier.

4. The method of claim 3, wherein a user of the first receiver defines at least a portion of the locally stored identifier information that is compared with the broadcast identifier information.

5. The method of claim 1, wherein the broadcast identifier information includes information identifying a geographic area to which the packet of data is directed, and wherein the broadcast identifier information is compared with information about a geographic location of the first receiver to determine whether the first receiver is in the geographic area to which the packet of data is directed.

6. The method of claim 1, wherein the packet of data includes an instruction to modify at least a portion of locally stored identifier information of the first receiver, and wherein the processing of the packet of data includes modifying the locally stored identifier information according to the instruction.

7. The method of claim 1, wherein the packet of data includes one or more of audio and video information, and wherein processing of the packet of data includes presenting the one or more of audio and visual information included in the packet of data using a user interface coupled to the first receiver.

8. A system for receiving data from a satellite radio network, comprising:

a first receiver for receiving a packet of data comprising a header portion and a body portion broadcast via a satellite radio network, wherein the header portion of the packet of data includes broadcast identifier information that is associated with a selected set of receivers configured to receive the broadcast that are intended recipients of the packet of data;

wherein the selected set of receivers configured to receive the broadcast are identified based on the broadcast identifier information included in the header;

a memory including locally stored identifier information;

a processor for comparing the selected set of receivers configured to receive the broadcast to the locally stored identifier information to determine if the first receiver is a member of the selected set of receivers configured to receive the broadcast that are intended recipients of the packet of data; and wherein the processor processes the packet of data if the first receiver is determined to be a member of the selected set of receivers configured to receive the broadcast that are intended recipients of the packet of data.

9. The system of claim 8, wherein the first receiver is located in a vehicle.

10. The system of claim 8, wherein the locally stored identifier information includes one or more of an individual identifier, a group identifier, and a category identifier.

11. The system of claim 10, wherein the packet of data includes an instruction to modify at least a portion of locally stored identifier information of the first receiver, and wherein the processing of the packet of data includes modifying the locally stored identifier information according to the instruction.

12. The system of claim 8, wherein the broadcast identifier information includes information identifying a geographic area to which the packet of data is directed, and wherein the broadcast identifier information is compared with information about a geographic location of the first receiver to determine whether the first receiver is in the geographic area to which the packet of data is directed.

13. The system of claim 8, further comprising a user interface coupled to the first receiver;

wherein the packet of data includes one or more of audio and video information; and wherein the processor presents the one or more of audio and visual information included in the packet of data via the user interface.

14. A system for broadcasting data for transmission via a satellite radio network, comprising:

logic for preparing a packet of data for broadcast, wherein the packet of data comprises a header portion and a body portion, and wherein the header portion of the packet of data further comprises broadcast identifier information associated with a selected set of receivers configured to receive the broadcast that are intended recipients of the packet of data;

a transmitter for broadcasting the packet of data including the header portion with the broadcast identifier information; and the system for broadcasting data further including a receiver for receiving a notification confirming that at least one intended recipient in the selected set of receivers has received the packet of data; and wherein the system for broadcasting data updates a database of information relating to the selected set of receivers configured to receive the broadcast that are intended recipients of the packet of data upon receipt of the notification.

15. The system of claim 14, wherein at least one of the receivers in the selected set of receivers is located in a vehicle.

16. The system of claim 14, wherein the broadcast identifier information includes information identifying a geographic area to which the packet of data is directed, and wherein the broadcast identifier information is compared with information about a geographic location of the at least one intended recipient receiver to determine whether the at least one intended recipient receiver is in the geographic area to which the packet of data is directed.

17. The system of claim 14, wherein the packet of data includes an instruction to modify at least a portion of locally stored identifier information of each of the receivers in the selected set of receivers that are intended recipients of the packet of data.

18. The system of claim 17, wherein the notification is received upon modification of the locally stored identifier information in the at least one intended recipient in the selected set of receivers.

19. The system of claim 14, wherein the notification is received via a cellular wireless communication link.

20. The system of claim 14, wherein the system updates the database upon receipt of the notification by indicating that the packet of data has been received by the at least one intended recipient in the selected set of receivers that transmitted the notification.

* * * * *